Patented May 22, 1951

2,554,143

UNITED STATES PATENT OFFICE 2,554,143

DRY PUDDING COMPOSITIONS

Henry C. Hinz, Jr., George R. Schermerhorn, Sr., and Frank L. Dorn, Rochester, N. Y., assignors to American Home Foods, Inc., New York County, N. Y., a corporation of New Jersey No Drawing. Application December 13, 1949, Serial No. 132,802

7 Claims. (Cl. 99—139)

This invention relates to a pudding composition and particularly to a pudding composition in the form of a substantially dry powder which on the addition of a liquid sets to a pudding of superior characteristics.

This invention is a continuation-in-part of our copending application, Ser. No. 7514, filed February 10, 1948, now Patent No. 2,500,179.

In the prior application above-identified, we have disclosed cold-liquid, "instant" pudding mixes of greatly improved characteristics over the known art. These compositions comprise essentially pregelatinized pudding starch, a sweetening agent and a casein coagulating agent which, in the presence of milk, gave a combined gelling action reinforcing that obtainable with the starch ingredient. In addition, and in order to facilitate gelatin and increase the degree of hydration, a chemical gelatinizing agent was incorporated in the starch product to further improve the characteristics of the final pudding product. An important aspect of our prior disclosure was the recognition of the advantage of small particle size of the pregelatinized starch used in the composition to reduce the amount of starch needed and to give improved smoothness and texture. The invention therefore pointed out the necessity for the starch ingredient being finer then 200 mesh (U. S. Standard). The fineness of the starch gave to the pudding a smoothness and fine texture not found in prior art puddings.

It has now been found that while extremely fine particle size possesses important advantages desirable in preparing "instant" pudding mixes a point is soon reached beyond about 250 mesh where a new problem is introduced which limits the extent of starch size reduction. Thus, in seeking particle sizes of the starch much finer than 250 mesh or about 60 microns we have found that an appreciable lumping begins to take place when liquid is added in the preparation of the pudding. This seems to become more and more pronounced as the particle size of the starch is reduced to the highly desirable, extremely fine sizes. Specifically, in seeking to obtain a fine pregelatinized starch particle of 44 micron size or more preferred, a size such as 10 microns or better still as fine as 5 micron size, the problem of lumping becomes aggravated to the point where it is quite difficult to prepare a smooth pudding product.

As a possible explanation for this lumping effect, it is believed that the effect is caused by the unduly rapid hydration of the very fine starch particles which surround large lumps of still unhydrated starch. That portion of the starch which quickly hydrates on the addition of aqueous medium is believed to form a difficultly penetrable layer over unhydrated starch preventing water from permeating and hydrating all the starch to the center of the mass.

The discovery has been made that lumping of the pudding on the addition of aqueous medium may be avoided if there is mixed with the finely divided pregelatinized starch a hydrophobic substance which coats the starch particle just sufficiently to impede the rate of hydration or prevent too rapid hydration and thereby permitting a uniform hydration of all of the starch without excessive lumping.

The hydration-retarding agent must of course be hydrophobic in character, non-toxic in the amounts used and substantially free from objectionable flavor, color and odor. Operable agents may be substantially inert or physiologically non-metabolizing, but it is preferred to use edible materials capable of performing the desired functions described. As examples, one may coat the fine starch particles with such hydrophobic substances as finely divided talc, or chalk or a substance of like nature, but it is preferred to use an oleaginous material selected from the class of oils, fats or waxes.

When an oleaginous agent is selected for incorporation with the pudding mix it has been found that in addition to its hydration-retarding effect the oleaginous character of the material imparts to the product a noticeably smooth texture, good appearance and even appears to improve the taste. It has been discovered as a matter of fact, that regardless whether a retarding effect is desired or even necessary, as in the case of large particle-size starch, the addition of a small amount of an oil, fat or wax, not more than about 10% by weight, based on starch, will improve even coarse starch puddings where the particle-size of the pregelatinized starch is as much as 150 microns in diameter or greater.

As oleaginous hydration-retarding agents, one may use vegetable oils, mineral oils, hydrogenated vegetable oils, animal or vegetable fats such as lard or butters, or waxes of animal, vegetable or mineral sources such as paraffin wax, beeswax, etc. In fact, oils, fats, waxes from any sources being hydrophobic are useful as long as such oleaginous substances are non-toxic in the amounts used and impart to the desired product no undesirable color, taste or odor.

It has been determined that a hydrophobic retarding agent which is capable of retarding the time of hydration to at least about 30 second hydration period can prevent undesirable lumping from occurring when preparing the pudding. In order to clarify what is meant by the term "time of hydration" as used here, it is best stated as the time the pudding product takes to visually begin to thicken or become viscous. Actually, while a minimum retardation of about 30 seconds before the pudding begins to thicken has been found necessary in order to prevent lumping, a retardation up to about 90 seconds or somewhat higher may be effected with desirable results.

To achieve the desired retarding time for the pregelatinized starch, the amount of hydration-retarding, hydrophobic agent to be incorporated with the starch has been found by careful experimentation to fall within the range of about 0.5 to about 10% by weight of the pregelatinized starch product, the particular amount selected within the aforesaid range depending in slight measure on the specific hydrophobic agent used, but more particularly on the length of time desired before hydration is to take effect, and the average particle size of the pregelatinized starch to be coated. Thus, when retarding starch hydration with a solid oleaginous agent such as hydrogenated vegetable oil, to obtain a time of hydration of from 30 to about 90 seconds with a particle size of starch of 10 microns, the preferred amount of agent falls within the range of about 0.75 to about 5% by weight of the starch. With an even finer particle size, for example 5 microns, the preferred amount of oleaginous agent will range from about 2.5 to about 6% by weight of the starch ingredient. As indicated above, even when retardation of starch hydration is not of major importance the use of an amount of oleaginous agent falling within the range of about 0.5–10% by weight, based on starch, will greatly improve the undesirable grainy appearance of coarse particle pregelatinized starch.

In preparing the pudding composition disclosed here, the procedure of application Ser. No. 7,514 is generally followed for preparing the pregelatinized starch. One uses a pudding starch, derived from maize, rice, arrowroot, tapioca or from other sources known to the art. This is mixed with water on a basis of about 1 part of starch to about ½ part to 10 parts of water by weight. To this mixture is added sugar to the extent of about $\frac{1}{10}$ to 2 parts of sugar to each part of starch by weight. This mixture is heated and dried, preferably on a roller dryer, although any other heating and drying system may be used with satisfactory results. Following the drying step, the product is quite frangible and may be ground to an extremely fine grain. A fineness of greater than 325 mesh (44 microns) is desirable with a preferred fineness of 5 to 10 micron size.

As indicated in the earlier case, a further improvement in the characteristics of the pregelatinized starch may be obtained by the addition of a chemical gelatinizing agent to the starch mixture prior to heating. Certain chemical compounds, notably alkaline compounds, and specifically the alkali and alkaline earth metal chlorides or hydroxides such as sodium hydroxide, sodium carbonate, sodium bicarbonate, calcium hydroxide, various metal thiocyanates, preferably alkaline thiocyanates or still more preferably calcium chloride have the property of increasing the degree of rehydration and the gelation characteristics of starch. To prepare an improved product by this method, one mixes 1 part of a pudding starch preferably a maize starch with about ½ to about 10 parts of water by weight. To this is added any one of the chemicals indicated above preferably to the extent of about 1 part of chemical gelatinizing agent such as calcium chloride to from about 20 to about 500 parts of starch, although a ratio of about 1 part of agent, preferably calcium chloride, to from 15 to 10,000 parts of starch is feasible. The product is then heated and dried in the manner described above and is finally ground to the fineness indicated, namely at least about 325 mesh. The addition of the chemical gelatinizing agent facilitates rehydration by increasing the degree of hydration and gelation of the final product. By its use one requires about 20% less starch than that required if pregelatinized starch alone was used.

Following the grinding operation to obtain the predetermined particle size on the pregelatinized starch whether prepared with pudding starch and water alone or together with chemical gelatinizing agent, the next step involves incorporation of the hydrophobic hydration-retarding agent with the pregelatinized starch.

The proper amount of hydrophobic agent, depending on the size of the starch particle and the time of hydration sought, is added to the starch product and the ingredients are intimately mixed by the use of any suitable mixing device such as a ribbon mixer, a comminuter, a tumbling mixer, a Raymond mill or a Mulling mill. If a solid oleaginous hydrophobic agent is used, it is preferred to heat the mix to about the softening point of the oleaginous ingredient to facilitate uniform incorporation. After the finely ground pregelatinized starch has been intimately mixed with the hydrophobic agent, the mixture is ready for final formula compounding. This includes the addition of salt, flavoring agent, a sweetener such as the various sugars or saccharin and desirably, a casein coagulating agent.

An important improvement in the pudding product is obtained by incorporating a casein coagulating agent such as an acid or proteolytic enzyme in the composition, as described in our earlier filed application. A valuable contribution of the casein coagulating agent is to add solid body to the reconstituted starch which improves the rehydration and gelation characteristics of the starch element. This combined gelation results in a pudding product that is tasty and free from gumminess. It does not have a starchy taste since it has less than normal starch content. It has a softer texture and a better consistency characteristic than those products prepared with either pregelatinized starch alone or with strong tasting flours that depend on rennet action to overcome the characteristics of the flour used. In addition, the use of a coagulating agent of the type described also permits a further reduction in starch contact of the product.

The acid type of casein coagulating agent contemplated as suitable for the purpose desired is preferably a solid, crystalline, mineral or organic acid which is nutritionally non-toxic and safe. Metaphosphoric, citric or tartaric acids are representative. While solid acids of this type are preferred, it is feasible to use mineral or organic acids of the liquid type provided, as in the case of the solid acids, that they are non-toxic.

If a proteolytic enzyme is used as the casein coagulating agent in the composition, the enzyme selected may be any of the well-known protein-splitting enzymes as for example, trypsin, pepsin, rennin or other proteolytic enzymes falling within this class.

It should be clearly understood that the casein coagulating agent is not for the purpose of overcoming gumminess since the novel starch product described here does not possess this characteristic. The casein coagulating agent coacts with the pregelatinized starch so that in the presence of milk a combined gelling action takes place due to the coagulating agent and the reconstituted starch. These together further minimize the total amount of starch needed in the product.

With regard to the specific type casein coagulating agent to be used, it would be preferable to select an acid if a fruit-flavored pudding was contemplated. For other flavors such as chocolate, butterscotch, vanilla and the like, the composition containing the proteolytic enzyme is best. However, for the latter flavors, an acid may be used but the acidity should be neutralized and this may be accomplished in a number of ways. By one method a neutralizing agent is added to the general mixture in a single package. An equally satisfactory product is achieved in a two-package system, one package containing the acid and the other package containing the neutralizing agent. Suitable neutralizing agents are calcium carbonate, calcium hydroxide, sodium carbonate, sodium bicarbonate, the corresponding potassium salts and any other alkaline salts which are stable in dry form, are reasonably soluble and of course, non-toxic in the amount used.

The following examples are illustrative of compositions containing the ingredients and the amounts one may use when the mixture is added to one pint of milk. It should be distinctly understood however that the amounts given are by way of illustration and are not to be considered limitative in any way. In addition, all of the ingredients as listed below are not required since one or more may be omitted or equivalent substitutions may be made. Obvious changes may be made by those skilled in the art without changing the essential characteristics and the basic concept of the invention.

*Example I*

To 500 grams of maize pudding starch are added 85 grams of sugar and 15 grams of calcium chloride. Approximately 500 grams of water are added and the mixture is heated and dried on a roller drier. The dried mixture is now ground, utilizing a micro-pulverizer, to an average particle size of about 5 microns. To 100 grams of the finely ground pregelatinized starch are now added 5 grams of hydrogenated cottonseed oil and the mixture is heated to about 90–110° F. and intimately mixed in a Raymond mill.

After complete and thorough mixing, the following composition is made up:

| Ingredients | Amount in Grams |
|---|---|
| Pregelatinized starch (pudding starch, cane sugar, and calcium chloride), 5 micron size | 27.00 |
| Hydrogenated cottonseed oil | 1.35 |
| Rennet enzyme (1:150,000) | 0.25 |
| Sugar | 76.00 |
| Salt | 1.25 |
| Vanilla flavor | 7.00 |
| Vanilla color | 0.05 |

Using substantially the above procedure the compositions as given in the following examples may be prepared for use with one pint of milk:

*Example II*

| Ingredients | Amount in Grams |
|---|---|
| Pregelatinized starch (pudding starch, cane sugar, calcium chloride), 17 micron size | 30.00 |
| Cottonseed oil | 0.15 |
| Sugar (sucrose) | 70.00 |
| Salt | 1.50 |
| Vanilla flavor | 1.00 |

*Example III*

| Ingredients | Amount in Grams |
|---|---|
| Pregelatinized starch (pudding starch, cane sugar, calcium chloride), 10 micron size | 20.00 |
| Lard | 0.15 |
| Sugar | 50.00 |
| Salt | 1.50 |
| Vanilla flavor | 5.00 |

*Example IV*

| Ingredients | Amount in Grams |
|---|---|
| Pregelatinized starch (pudding starch, sugar), 5 micron size | 30.0 |
| Paraffin wax | 1.5 |
| Sugar | 70.0 |
| Salt | 1.5 |
| Vanilla flavor | 2.0 |

*Example V*

| Ingredients | Amount in Grams |
|---|---|
| Pregelatinized starch (pudding starch, sugar), 5 micron size | 45.00 |
| Cocoa butter | 4.50 |
| Sugar | 80.00 |
| Salt | 1.50 |
| Proteolytic enzyme (rennet 1:150,000) | 0.25 |
| Butterscotch flavor | 10.00 |

*Example VI*

| Ingredients | Amount in Grams |
|---|---|
| Pregelatinized starch (pudding starch, sugar, calcium chloride), 10 micron size | 30.00 |
| Corn oil | 0.45 |
| Citric acid | 3.00 |
| Lemon flavor | 5.00 |
| Salt | 1.00 |
| Sugar | 80.00 |

*Example VII*

| Ingredients | Amount in Grams |
|---|---|
| Pregelatinized starch (pudding starch, sugar, calcium chloride), 5 micron size | 40.00 |
| Olive oil | 1.20 |
| Tartaric acid | 3.00 |
| Calcium hydroxide | 0.75 |
| Salt | 1.00 |
| Vanilla flavor | 4.00 |
| Sugar | 80.00 |

The following example illustrates a coarse starch pudding composition having an increased smoothness and improved texture due to the presence of an oleaginous material.

*Example VIII*

| Ingredients | Amount in Grams |
|---|---|
| Pregelatinized starch (pudding starch, sugar, calcium chloride), 150 micron size | 30.00 |
| Hydrogenated cottonseed oil | 0.15 |
| Salt | 1.50 |
| Sugar | 70.00 |
| Vanilla flavor | 5.00 |

The composition as given in the following example requires only the addition of a pint of water either cold or at room temperature for a pudding of superior characteristics.

*Example IX*

| Ingredients | Amount in Grams |
|---|---|
| Pregelatinized starch (pudding starch, sugar and calcium chloride), 5 micron size | 30.0 |
| Cocoa butter | 1.5 |
| Dried Milk | 20.0 |
| Butterscotch sugar | 10.0 |
| Salt | 1.5 |
| Sucrose | 60.0 |

As heretofore mentioned the above Examples merely illustrate preferred compositions. If desired, such compositions may have other ingredients in addition to those indicated such as stabilizers, antioxidants, neutralizing agents (when using acid coagulating agents and bland flavors), etc. It has been found that excellent puddings may be prepared even though the amounts of specific ingredients are varied within rather wide limits. Thus, in the examples, the pregelatinized starch may be varied between 15 to 60 grams and the acid may be varied from 0.5 to about 5.0 grams while the enzyme may be varied from about 0.075 to about 5.0 grams for 16 ounces of milk. In the latter case, the amount is based on an enzyme having a strength of about 1 part of enzyme to about 150,000 parts of milk, by weight. The amount of salt, sweetening agent and flavor may be varied to suit the taste.

As the particle size of the starch is reduced to smaller and smaller dimensions more hydrophobic retarding agent is needed to prevent lumping. Considering an average of about 5 micron size of starch particle to be as fine as is commercially feasible, not more than about 10% by weight of hydrophobic hydration-retarding agent based on starch is necessary to prevent unduly rapid hydration since this amount retards hydration for about 90 seconds. This is well within the time needed for prevention of lumping.

Having described our invention, we claim:

1. A dry composition for producing a pudding comprising pregelatinized pudding starch, a hydrophobic agent for retarding the hydration of the starch substantially uniformly commingled with said starch in an amount not exceeding about 10% by weight of the starch, and a sweetening agent.

2. A dry composition for producing a pudding comprising finely divided pregelatinized pudding starch, a hydrophobic agent for retarding starch hydration substantially uniformly commingled with said starch in an amount not exceeding about 10% by weight of the starch, and a sweetening agent.

3. A dry composition for producing a pudding comprising finely divided pregelatinized pudding starch of at least about 150 mesh (U. S. Standard), a hydrophobic agent for retarding starch hydration substantially uniformly commingled with said starch in an amount not exceeding about 10% by weight of the starch, and a sweetening agent.

4. A dry composition for producing a pudding comprising finely divided pregelatinized pudding starch of at least about 150 mesh (U. S. Standard), a hydrophobic hydration-retarding agent for the starch which is substantially uniformly commingled with said starch in an amount not exceeding about 10% by weight of the starch, and a sweetening agent.

5. A dry composition for producing a pudding comprising finely divided pregelatinized pudding starch of at least about 150 mesh (U. S. Standard), an oleaginous hydration-retarding agent for the starch which is substantially uniformly commingled with said starch in an amount not exceeding about 10% by weight of the starch, and a sweetening agent.

6. A dry composition for producing a pudding comprising pregelatinized pudding starch, a hydrophobic agent for retarding starch hydration substantially uniformly commingled with said starch in an amount not exceeding about 10% by weight of the starch, a casein coagulating agent, and a sweetening agent.

7. A dry composition for producing a pudding comprising pregelatinized pudding starch containing a rehydration and gelatinizing agent, a hydrophobic agent for retarding starch hydration substantially uniformly commingled with said starch in an amount not exceeding about 10% by weight of the starch, a casein coagulating agent, and a sweetening agent.

HENRY C. HINZ, JR.
GEORGE R. SCHERMERHORN, SR.
FRANK L. DORN.

REFERENCES CITED

The following references are of record in the file of this patent:

UNITED STATES PATENTS

| Number | Name | Date |
|---|---|---|
| 2,221,563 | Young | Nov. 12, 1940 |
| 2,500,179 | Hinz et al. | Mar. 14, 1950 |